United States Patent
Yoon

(10) Patent No.: US 7,269,676 B2
(45) Date of Patent: Sep. 11, 2007

(54) METHOD AND APPARATUS FOR CONTROLLING AN EXTERNAL RF DEVICE WITH A DUAL PROCESSOR SYSTEM

(75) Inventor: Seong-Ho Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 10/752,965

(22) Filed: Jan. 7, 2004

(65) Prior Publication Data

US 2004/0177188 A1   Sep. 9, 2004

(30) Foreign Application Priority Data

Jan. 8, 2003   (KR)   ...................... 10-2003-0000945

(51) Int. Cl.
*G06F 12/00* (2006.01)
(52) U.S. Cl. ...................... 710/244; 710/243
(58) Field of Classification Search .............. 710/240, 710/110, 241, 243, 244, 305, 309, 65, 69, 710/71, 72; 370/462
See application file for complete search history.

(56) References Cited

U.S. PATENT DOCUMENTS 6,738,845 B1 *   5/2004   Hadwiger et al. ........... 710/240
7,006,521 B2 *   2/2006   Nguyen et al. .............. 370/462
7,062,587 B2 *   6/2006   Zaidi et al. ................. 710/305
2003/0120877 A1 *   6/2003   Jahnke ........................ 711/150

FOREIGN PATENT DOCUMENTS

EP           1 207 457 A1      5/2002
WO       WO 03/009151 A1      1/2003

OTHER PUBLICATIONS

PAC Dual Core Lower Multimedia SoC Platform, SoC Technology Center, Copyright 2005.*
Mobile Phone (Cell Phone) Electronics, radio-electronics.com.*
Cell-Phone Handset Design, Analog Devices Inc.*
Definition of Shift Register from Wikipedia.*

* cited by examiner

Primary Examiner—Khanh Dang
(74) Attorney, Agent, or Firm—F. Chau & Assoc., LLC

(57) ABSTRACT

A method and apparatus for controlling a device by a serial link from a dual processor system. The configuration of the circuit is simplified and efficiency is enhanced by using independent internal buses and serial link control hardware for each processor and by selecting the active control hardware through arbitration. An MCU and a DSP can operate asynchronously and use their respective internal bus at the same time.

19 Claims, 3 Drawing Sheets

METHOD AND APPARATUS FOR CONTROLLING AN EXTERNAL RF DEVICE WITH A DUAL PROCESSOR SYSTEM

TECHNICAL FIELD

The present invention relates to telecommunications and cellphone operation and design. The invention relates to a method and apparatus for effectively controlling a radio frequency (RF) device through a serial data link shared by dual processors.

BACKGROUND

The number of cellular phone users all over the world is rapidly increasing and various new communication products supporting various new systems and services are being introduced. Currently, third-generation communication products based on CDMA 2000(Code Division Multiplex Access 2000) and W-CDMA(Wide-CDMA) technologies, and new information content and services, are being developed. In Europe, 2.5-generation GSM/GPRS products are well established. Third-generation communication systems need high-speed transmission, multimedia capabilities and compatibility with other communication systems. For example, a radio terminal requires dual mode operability and several communication protocol stacks in software. Before the invention of the stored program computer all software functions were implemented in single-function dedicated hardware. Software defined radio (SDR) technology enables a wireless terminal to support various kinds of wireless systems and services, such as second-and third-generation mobile systems (PDC*1,PHS, W-CDMA*2, GSM*3, etc.) and wireless LANs. By simply changing the software to reconfigure the terminal, users will be able to enjoy various wireless services in a seamless manner.

A communication system employs a digital signal processor (DSP) to reduce the signal processing load on a micro control unit (MCU). The DSP chip must be capable of boot-loading and needs a software program to perform any actual signal processing operation, the software program being downloaded from a memory device (e.g., a mass storage memory device) connected to the MCU and then being stored at an internal program memory thereof.

A semiconductor modem SOC (System On Chip) built into the radio terminal performs baseband signal processing, while the dual processor system (e.g., the MCU and the DSP) controls the operation of the overall system. The MCU handles the flow and control of the overall processing, while the DSP executes a specific signal processing based on the modem system in software or hardware. Thus, the radio terminal has a mass storage memory device and many hardware logics for a specific purpose, and such hardware logics are sometimes called Intellectual Property (IP). The modem SOC should be able to control a mixing signal device and a Radio Frequency (RF) device that are external to the modem SOC and an A/D converter, a D/A converter and a filter etc. that are built-in. Thus, the modem SOC has an interface RF Control circuit (IP) that is matched with an external device to be controlled.

For example, an RF control circuit (IP) is adapted to control an external RF device, the modem SOC reads/writes a control register of the external RF device by using the RF control IP. At this time, the MCU and the DSP should be able to access all the RF control circuit (IP) so as to share the one RF control circuit's function between two processors. Therefore, the respective buses used by the MCU and the DSP are connected to one RF control circuit (IP), and each processor has authority to access the RF control circuit (IP) through arbitration between respective accesses so as to alternately control the external RF device.

FIG. 1 is a block diagram showing an IP sharing device in a conventional system employing asynchronous dual processors.

Referring to FIG. 1, an arbiter 14 outputs a wait signal (WAIT) or a bus-grant signal (WAITNOT, being the logical complement of the WAIT signal) so that either the MCU 10 or the DSP 12 will communicate with the RF control circuit (IP) 26. If the arbiter 14 grants the bus access to the MCU 10, the arbiter 14 outputs a control signal (SELECT) so that the first through third MUXs (20, 22, 24) respectively select the address (Addr), the read/write strobe signal (nRW) and the data (Data) outputted from the MCU 10 through a first internal bus 16. If the arbiter 14 grants the bus access to the DSP 12, the arbiter 14 outputs a control signal (e.g., SELECTNOT, being the logical complement of SELECT) so that the first through third MUXs (20, 22, 24) respectively select the address (Addr), the read/write strobe signal (nRW) and the data (Data) outputted from the DSP 12 through a second internal bus 18.

The MCU 10 handles the flow and control of overall processing and receives the internal bus grant signal (WAITNOT) from the arbiter 14 to activate first internal bus 16 and to send and receive an address (Addr), a read/write strobe signal(nRW) and read/write data signal (Data) so as to communicate with the RF control circuit (IP) 26. The DSP 12 receives an internal bus grant signal from the arbiter 14 to activate a second internal bus (18) and to send and receive an address (Addr), a read/write strobe signal (nRW), and read/write data signal (Data) so as to perform a specific processing task with the shared RF control circuit (IP) 26.

First, second, and third multiplexers (MUX) (20, 22, 24) respectively receive and selectively output the addresses (Addr), the read/write strobe signals (nRW) and the read/write data signal (Data) outputted from either the MCU 10 or the DSP 12 in response to a control signal (SELECT) from the arbiter 14. That is, the first , second, and third multiplexers (MUX) (20, 22, 24) individually output one set of the address (Addr), the read/write strobe signal (nRW) and the data signal (Data) outputted from either the MCU 10 or the DSP 12. The RF control circuit (IP) 26 receives and stores the address (Addr), the read/write strobe signal (nRW) and the data (Data) respectively outputted from the first, second and third MUXs (20, 22, 24), and receives and constantly divides a system clock signal (not shown) to output a serial clock signal (SCLK), serial data (SDATA) and a serial enable signal (SEN) to an external device 28.

The arbiter 14 receives the address (Addr) and the read/write strobe signal (nRW) from either the MCU 10 or the DSP 12, and outputs a bus grant signal (WAITNOT) by a predetermined priority. That is, when the arbiter 14 grants a bus access to the MCU 10 according to the predetermined priority, the arbiter 14 applies a wait signal (WAIT) to the DSP 12. Conversely, when granting the bus access to the DSP 12, the arbiter 14 applies the wait signal (WAIT) to the MCU 10.

When the wait signal (WAIT) is applied to the MCU 10 or to the DSP 12, the MCU 10 or the DSP 12 stops operating and goes into a stand-by state. Also, the MCU 10 or the DSP 12 to which the wait signal (WAIT) is not applied, accesses the internal bus (16 or 18 respectively), and communicates with the RF control circuit (IP) 26, sending and receiving the address (Addr), the read/write strobe signal (nRW), and the read/write data(Data). At this time, the RF control circuit (IP) 26 communicates with the external device 28, transmitting serial data SDATA, a serial enable signal SEN, and a serial clock signal SCLK to the external device 28.

However, in such a conventional asynchronous dual processor system, while any one processor (e.g., either MCU 10 or the DSP 12) accesses the RF control circuit (IP), if the other processor tries to access at the same time, the processor having the access must stop operating. If the serial clock signal SCLK, the serial data SDATA and the serial enable signal SEN (the serial links outputted to the external device 28) have a long operation time, the other processor must stop operating and stand by during the operation time of the one processor, which reduces the efficiency of the system.

Furthermore, the conventional asynchronous dual processor system employs many MUXs to select each one of many addresses (Addr), read/write strobe signals (nRW) and data (Data) through arbitration and then to respectively apply each of those signals to one RF control circuit (IP) 26, thus causing a complicated circuit configuration.

SUMMARY OF THE INVENTION

The present invention is directed to a method and apparatus for sharing control of serially linked external device (e.g., an RF device) between processors in a multiprocessor (e.g., a dual processor. MCU/DSP) system, in which the configuration of the circuit is simplified, and efficiency of the system is improved. By using an independent internal bus for each processor and by selecting (i.e., multiplexing) only a serial link outputted to the external device through arbitration, the efficiency of control of the external device is enhanced since the MCU and a DSP can respectively use their own dedicated internal bus at the same time in an asynchronous dual processor system.

According to one aspect of the present invention, an apparatus is provided for controlling an external device through a serial link, the apparatus comprising. a first processor operatively connected to a first bus and a second processor operatively connected to a second bus; a first and second control circuit for receiving and storing an address, a read/write strobe signal and data outputted from each processor respectively, through their respective internal buses, and outputting serial data derived from the data outputted from the respective processor; an arbiter for receiving serial link request signal from each of the first and second control circuits, and for outputting a serial link grant signal and an MUX selection signal according to a predetermined priority; and a multiplexer (MUX) for selectively outputting the selected serial data from either one of the first or second control circuits in response to the MUX selection signal from the arbiter.

Each control circuit includes a control register for receiving and storing an address, a read/write strobe signal and data inputted through an internal bus by a first system clock signal provided from the a processor (e.g., an MCU or DSP), and transmitting a serial link request signal to the arbiter; a shift register for receiving the data stored at the control register and converting the data into serial data, and outputting the serial data and a serial enable signal in response to a serial link grant signal applied from the arbiter; and a divider for constantly dividing the system clock signal provided from the processor to output the signal as the serial clock signal.

In another aspect of the invention, a method for controlling an external device through serial link from a system using asynchronous dual processors (such as an MCU and a DSP) is provided The method comprises the steps of. enabling a first processor (e.g., an MPU) operatively connected to a first control circuit through a internal first bus, and a second processor (e.g., a DSP) operatively connected to a second control circuit through a second bus, to independently access respective address, a read/write strobe signal and data through the first and second internal buses regardless of a serial link use grant; transmitting a serial link request signal output from the first or second control circuit to an arbiter for selecting which of the first and second processors (MPU or DSP) shall be the source of the data to be transmitted as serial data by a serial link to control the device; and transmitting serial data, and a serial enable signal, and a serial clock signal, outputted from one of the first and second control circuits, to the external device through the serial link when a serial link grant signal is applied from the arbiter by a predetermined priority.

DETAILED DESCRIPTION OF PREFERRED EMBODIMENTS

Hereinafter, preferred embodiments of the present invention will be described in detail with reference to the accompanying drawings. For purposes of clarity, a detailed description of functions and systems known to persons skilled in the art have been omitted.

Figure 1:
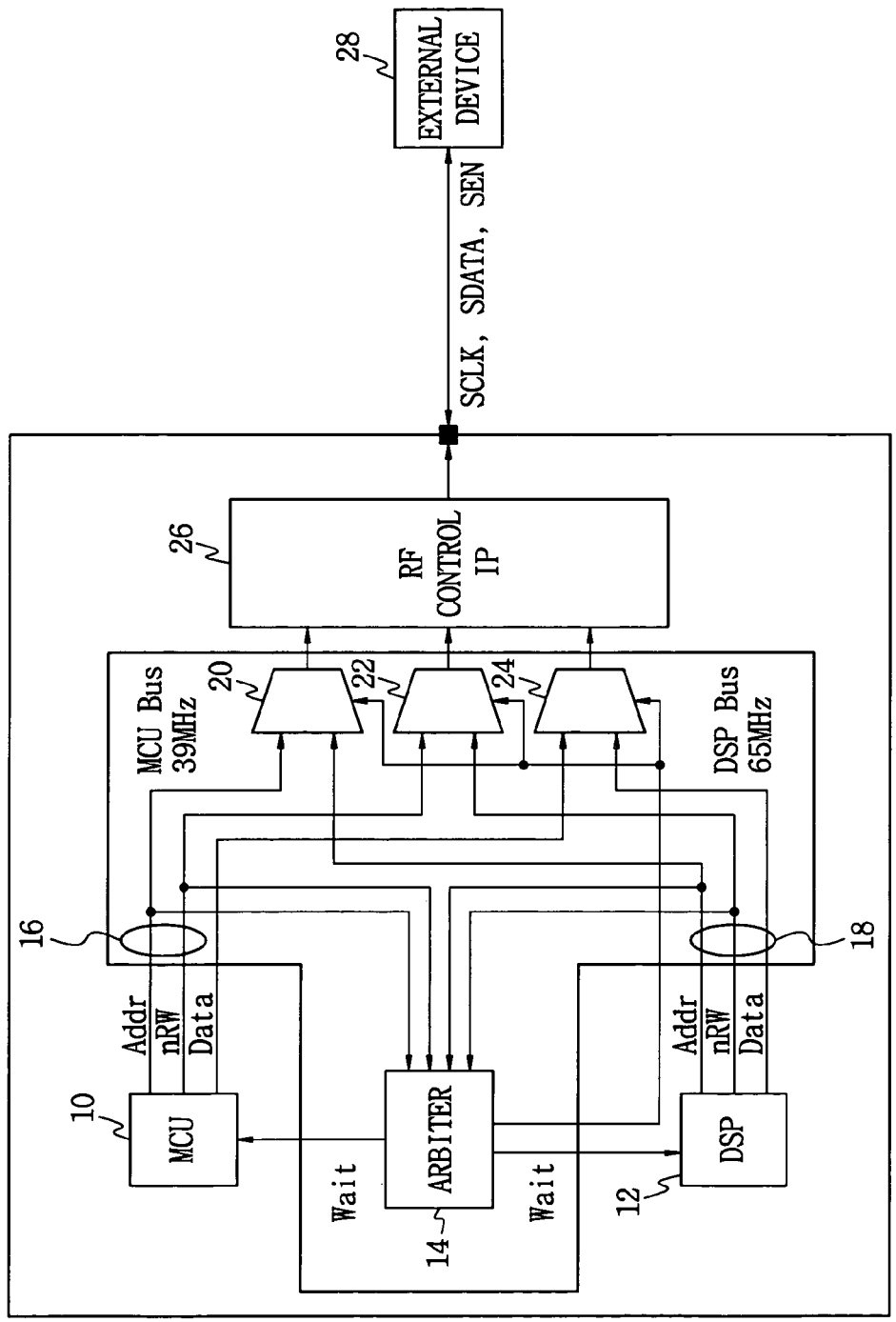
FIG. 1 is a block diagram of a conventional RF circuit control apparatus including a shared an RF control circuit (IP) in a conventional dual processor system.
Figure 2:
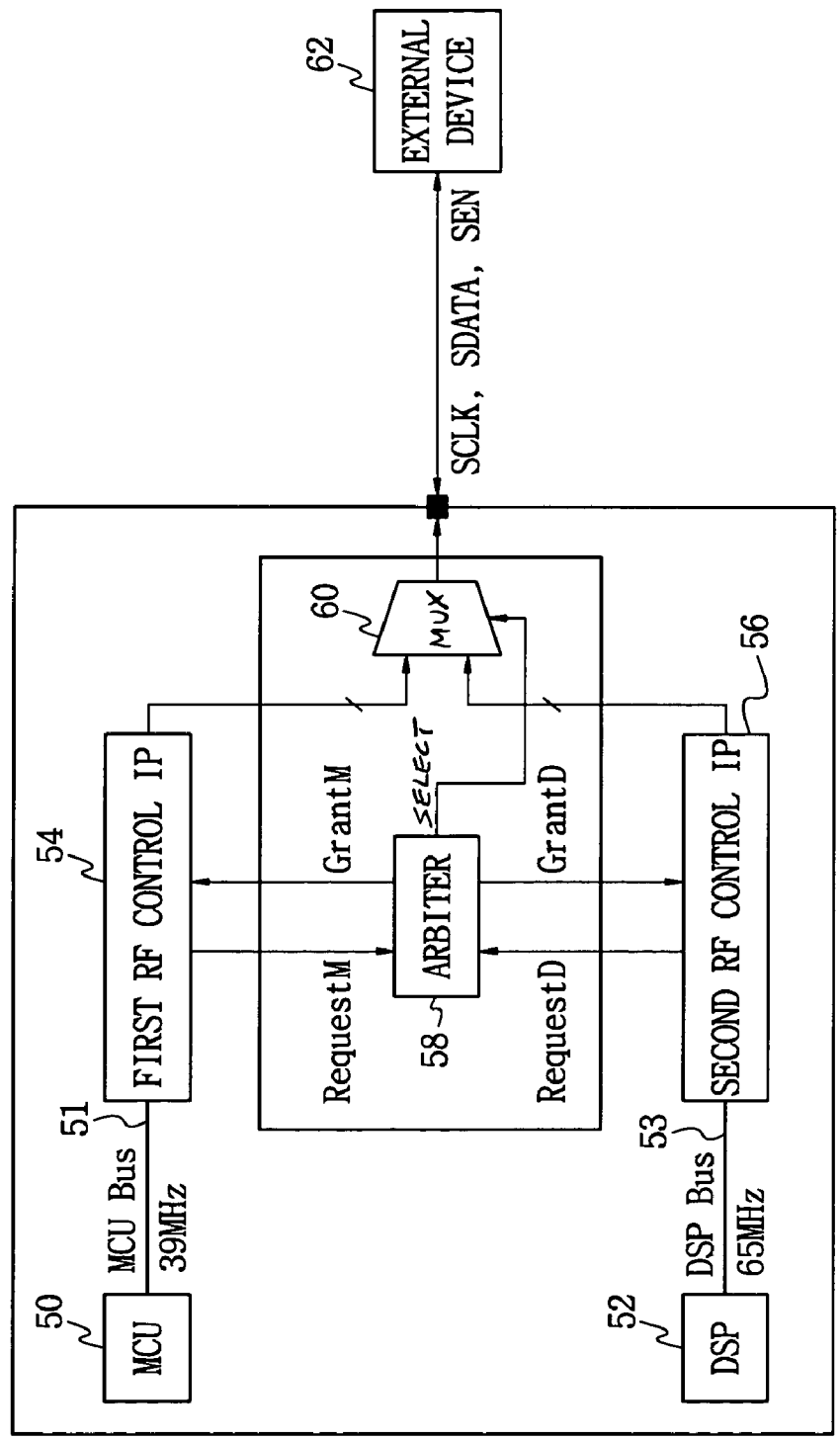
FIG. 2 is a block diagram of dual processor RF control apparatus each processor having independent buses according to an exemplary embodiment of the present invention.

FIG. 2 is a block diagram of a dual processor RF control apparatus according to an exemplary embodiment of the present invention.

Referring to FIG. 2, an MCU 50 handles the flow and control of overall processing and communicates with a first RF control circuit (IP) 54, sending and receiving an address (Addr), a read/write strobe signal (nRW) and read/write data (Data) through an internal bus 51 synchronized with a clock signal of 39 MHz. A DSP 52 performs a specific processing operation based on a modem system and communicates with a second RF control circuit (IP) 56, sending and receiving an address (Addr), a read/write strobe signal (nRW) and read/write data (Data) through an internal bus 53 synchronized with a clock signal of 65 MHz.

The first RF control circuit (IP) 54 receives and stores the address (Addr), the read/write strobe signal (nRW) and the data (Data) that are outputted through the internal bus 51 from the MCU 50, and also receives and constantly divides a system clock signal (39 MHz) to output a serial clock signal SCLK, serial data SDATA and a serial enable signal SEN. The second RF control circuit (IP) 56 receives and stores the address (Addr), the read/write strobe signal (nRW) and the data (Data) outputted through the internal bus 53 from the DSP 52, and also receives and constantly divides a system clock signal (65 MHz) to output a serial clock signal SCLK, serial data SDATA and a serial enable signal SEN.

Arbiter 58 receives serial link request signals (RequestM, RequestD) provided from the first and second RF control circuit (IP)s 54, 56, and outputs a serial link grant signal (GrantM, GrantD) and a MUX selection signal (SELECT) according to a predetermined priority. A multiplexer MUX 60 selectively outputs the serial clock signal SCLK, the serial data SDATA, and the serial enable signal SEN outputted from the first RF control circuit (IP) 54 or the first RF control circuit (IP) 56 in response to the MUX selection signal of the arbiter 58.

Figure 3:
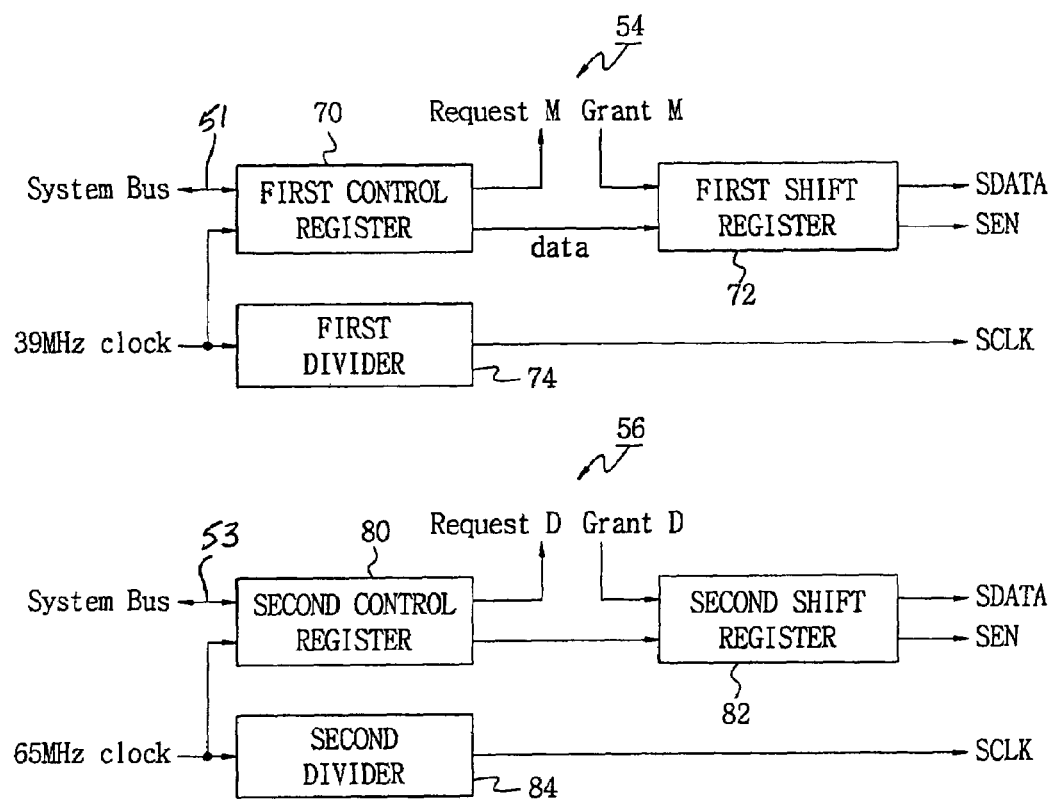
FIG. 3 is a block diagram illustrating in detail the configuration of first and second RF control circuit (IP)s shown in FIG. 1.

FIG. 3 is a block diagram in detail showing a configuration of the first and second RF control circuit (IPs 54, 56) according to an exemplary embodiment of the present invention.

Referring to FIG. 3, the first RF control circuit (IP) 54 includes a first control register 70 for receiving and storing the address (Addr), the read/write strobe signal (nRW) and the data (Data) inputted through the internal bus 51 by the system clock signal (39 MHz) provided from the MCU 50 (FIG. 2), and transmitting a serial link request signal (Request M) to the arbiter 58 (FIG. 2); a first shift register 72 for receiving the data stored at the first control register 70, and converting the data into serial data (SDATA), and outputting the serial data SDATA and the serial enable signal SEN in response to a serial link grant signal (Grant M) applied from the arbiter 58 (FIG. 2); and a first divider 74 for constantly N-dividing the system clock signal (39 MHz) provided from the MCU 50 (FIG. 2), to output the signal as the serial clock signal SCLK.

Also, the second RF control circuit (IP) 56 includes a second control register 80 for receiving and storing the address (Addr), the read/write strobe signal (nRW) and the data (Data) inputted through the internal bus 53 by the system clock signal (65 MHz) provided from the DSP 52 (FIG. 2), and transmitting a serial link request signal (Request D) to the arbiter 58; a second shift register 82 for receiving the data stored at the second control register 80, and converting the data into serial data SDATA, and outputting the serial data SDATA and the serial enable signal SEN in response to a serial link grant signal (Grant D) applied from the arbiter 58; and a second divider 84 for constantly M-dividing the system clock signal (65 MHz) provided from the DSP 52 (FIG. 2), to output the signal as the serial clock signal SCLK.

Operations in the preferred exemplary embodiments of the present invention will be explained in detail with reference to FIGS. 2 and 3.

The MCU 50 deals with a flow and control of overall processing, and communicates with the first RF control circuit (IP) 54, sending and receiving an address (Addr), a read/write strobe signal (nRW) and read/write data (Data) by a clock signal of 39 MHz through the internal bus 51.

The DSP 52 performs a specific processing function based on a modem system, and communicates with the second RF control circuit (IP) 56, sending and receiving an address (Addr), a read/write strobe signal (nRW) and read/write data (Data) by a clock signal of 65 MHz through the internal bus 53.

The first RF control circuit (IP) 54 receives and stores the address (Addr), the read/write strobe signal (nRW) and the data (Data) outputted through the internal bus 51 from the MCU 50, and also receives and constantly divides the system clock signal (39 MHz) to output a serial clock signal SCLK, serial data SDATA and a serial enable signal SEN.

The first control register 70 receives and stores the address (Addr), the read/write strobe signal (nRW) and the data (Data) inputted through the internal bus 51 by the system clock signal (39 MHz) provided from the MCU 50, and transmits a serial link request signal (Request M) to the arbiter 58. The first shift register 72 receives and shifts the data stored at the first control register 70 and converts the data into serial data SDATA, and outputs the serial data SDATA and the serial enable signal SEN to an external device 62 in response to a serial link grant signal (Grant M) applied from the arbiter 58. The first divider 74 constantly N-divides the system clock signal (39 MHz) provided from the MCU 50 to output the serial clock signal SCLK to the external RF device 62.

The second RF control circuit (IP) 56 receives and stores the address (Addr), the read/write strobe signal (nRW) and the data (Data) outputted through the internal bus 53 from the DSP 52, and receives and constantly divides the system clock signal (65 MHz) to output a serial clock signal SCLK, serial data SDATA and a serial enable signal SEN.

The second control register 80 receives and stores the address (Addr), the read/write strobe signal (nRW) and the data (Data) inputted through the internal bus 53 by the system clock signal (65 MHz) provided from the DSP 52, and transmits a serial link request signal (Request D) to the arbiter 58. The second shift register 82 receives and shifts the data stored at the control register 80 and converts the data into serial data SDATA, and outputs the serial data SDATA and the serial enable signal SEN to the external device 62 in response to a serial link grant signal (Grant D) output from the arbiter 58. The second divider 84 constantly M-divides the system clock signal (65 MHz) provided from the DSP 52 to output the serial clock signal SCLK to the external RF device 62.

The arbiter 58 receives the serial link request signals (RequestM, RequestD) provided from the first and second RF control circuits (IPs 54 and 56 respectively), and outputs a serial link grant signal (GrantM or GrantD) and a corresponding MUX selection signal (SELECT) by a predetermined priority. The MUX 60 selectively outputs the serial clock signal SCLK, the serial data SDATA and the serial enable signal SEN outputted from the first RF control circuit (IP) 54 or from the second RF control circuit (IP) 56 in response to the MUX selection signal (SELECT) of the arbiter 58.

Therefore, the MCU 50 and the DSP 52 can access the address (Addr), the read/write strobe signal (nRW) and the data (Data) etc. through the respective first and second RF control circuits (IPs 54 and 56 respectively) and the respective internal buses 51, 53, regardless of a serial link use grant (i.e., independent of the state of Grant M, Grant D or SELECT). Only when a serial link request (Request M or Request D) is granted, will one of the first and second RF control circuits (IPs 54 or 56) control the external device 62 by the serial link.

Herein, the serial link between the inventive RF control apparatus and the external RF device 62 refers to a link for transmitting the serial clock signal SCLK, the serial data SDATA and the serial enable signal SEN to the external device 62 so as to control the external device 62. In the exemplary RF control apparatus of FIG. 2, the MCU 50 operates by a clock of 39 MHz and the DSP 52 operates by a clock of 65 MHz, thus the MCU 50 and the DSP 52 have a mutually asynchronous relation. The MCU 50 and the DSP 52 individually operate by each asynchronous clock of 39 MHz and 65 MHz, and the serial clock signal SCLK of the serial link through the first and second RF control circuits (IPs 54 and 56) operates at 13 MHz or less.

In other embodiments of the invention, other clock speeds can be applied, resulting in synchronous or mutually asynchronous dual processor operation. The principles of the invention may also be extended to support multiple processors (i.e., more than two) in synchronous or mutually asynchronous processor operation. The principles of the invention may also be extended to applications beyond the control of radio frequency (RF) devices. Accordingly, the device to be controlled by the shared serial link from the inventive dual processor system could be any electronic, electrical, or electromechanical, or electro-optical or any other device having a suitable serial link port for external control.

As described above, in the present embodiment of the invention, an MCU and a DSP of a dual processor system can access to an address (Addr), a read/write strobe signal (nRW) and data (Data) etc. respectively through a first and a second RF control (IPs 54 and 56) and respective internal buses (51 and 53), regardless of a serial link use grant. Only when a serial link is asserted to the external RF device 62, will a serial link use grant be performed so that one of the first and second RF control circuits (IPs 54 and 56) can access the external device, thereby resulting in simplifying the configuration of the system hardware and maximizing the efficiency of the use of the internal bus operatively connected to each of MCU 50 and the DSP 52.

It will be apparent to those skilled in the art that various modifications and variations can be made in preferred embodiments of the present invention without deviating from the spirit or scope of the invention. Thus, it is intended that the present invention cover the modifications and variations of the exemplary embodiments, as defined by the appended claims.

What is claimed is:

1. An apparatus for outputting a serial link to control a device, comprising:
   an arbiter for receiving first and second serial link request signals, and for outputting a MUX selection signal and one of a first and second serial link grant signal according to a predetermined priority;
   a first control register for receiving and storing the address, the read/write strobe signal and the data inputted from the first processor through a first bus, and for transmitting a first serial link request signal to an arbiter;
   a first shift register for receiving the data stored at the first control register, converting the data into serial data, and outputting the serial data in response to a first serial link grant signal applied from the arbiter;
   a second control register for receiving and storing an address, a read/write strobe signal and data inputted from a second processor through a second bus, and transmitting a second serial link request signal to the arbiter;
   a second shift register for receiving the data stored at the second control register converting the data into serial data, and outputting the serial data in response to a second serial link grant signal applied from the arbiter; and
   a multiplexer (MUX) for selectively outputting the selected serial data from either one of the first or second shift registers in response to the MUX selection signal from the arbiter.

2. An apparatus for outputting a serial link to control a device, comprising
   a first control circuit for receiving and storing an address, a read/write strobe signal and data outputted from a first processor through a first bus, and outputting serial data derived from the data outputted from the first processor;
   a second control circuit for receiving and storing an address, a read/write strobe signal and data outputted from a second processor through a second bus, and outputting serial data derived from the data outputted from the first processor;
   an arbiter for receiving serial link request signal from each of the first and second control circuits, and for outputting at least one of a serial link grant signal and a MUX selection signal according to a predetermined priority;
   a multiplexer (MUX) for selectively outputting the selected serial data from either one of the first or second control circuits in response to the MUX selection signal from the arbiter, wherein the first control circuit comprises.
   a first control register for receiving and storing the address, the read/write strobe signal and the data inputted from the first processor through the first bus, and for transmitting a serial link request signal to the arbiter;
   a first shift register for receiving the data stored at the first control register and for converting the data into serial data, and for outputting the serial data in response to the serial link grant signal applied from the arbiter.

3. The apparatus of claim 2, wherein the second control circuit comprises:
   a second control register for receiving and storing the address, the read/write strobe signal and the data inputted from the second processor through the second bus, and for transmitting the serial link request signal to the arbiter;
   a second shift register for receiving the data stored at the second control register and for converting the data into serial data, and outputting the serial in response to the serial link grant signal applied from the arbiter.

4. The apparatus of claim 3, wherein at least one of the first and second control circuits is implemented as a field programmable gate array (FPGA).

5. The apparatus of claim 2, wherein both of the first and second control circuits further outputs a serial clock signal of the same frequency for regulating the transmission of the serial data.

6. The apparatus of claim 5, wherein:
   the first control circuit further comprises a first divider for dividing a first system clock signal provided from the first processor to generate and output the serial clock signal; and
   the second control circuit comprises a second divider for dividing a second system clock signal provided from the second processor to generate and output the serial clock signal.

7. The apparatus of claim 6, wherein the first processor and the second processor operate mutually asynchronously from each other.

8. The apparatus of claim 3, wherein the operative frequency of the system clock of the first processor is not equal to the operative frequency of the system clock signal of the second processor.

9. The apparatus of claim 8, wherein frequency of a first system clock signal of the first processor is 39 MHz and die frequency of a second system clock signal of the second processor is 65 MHz.

10. The apparatus of claim 8 wherein the serial clock signal is equal to or less than 13 MHz.

11. The apparatus of claim 3 wherein the device is a radio frequency (RF) device.

12. The apparatus of claim 3 wherein the first processor is a microprocessor unit (MPU) and die second processor is a digital signal processor (DSP).

13. The apparatus of claim 1, wherein the device is a is a radio frequency (RF) device; and
  wherein the operative frequency of the system clock of the first processor is not equal to the operative frequency of the system clock signal of the second processor, and the first processor and the second processor operate mutually asynchronously from each other.

14. A method for controlling a device through a serial link with a dual processor system, said method comprising the steps of:
  receiving and storing, in a first control circuit, a first address, a first read/write strobe signal and first data inputted from a first processor through a first bus, wherein the first control circuit comprises:
    a first control register for receiving and storing the first address, the at the first read/write strobe signal and the first data inputted from the first processor through a first bus, and for transmitting a first serial link request signal to an arbiter; and
    a first shift register for receiving the first data stored at the first control register, converting the first data into first serial data, and outputting the first serial data in response to a serial link grant signal applied from the arbiter;
  receiving and storing, in a second control circuit, a second address, a second read/write strobe signal and second data inputted from a second processor through a second bus;
  converting the second data into second serial data;
  transmitting a serial link request signal output from the first or second control circuit to an arbiter for selecting one of the first and second processors to be the source of the data to he transmitted by the serial link to control the device; and
  transmitting selected first or second serial data, and a serial enable signal, and a serial clock signal, outputted from the selected one of the first and second control circuits, to the device in response to a serial link grant signal applied from the arbiter according to a predetermined priority.

15. The method of claim 14 wherein the device is a radio frequency (RF) device.

16. The method of claim 14 wherein the first processor is an microprocessor unit (MPU) and the second processor is a digital signal processor (DSP).

17. The method of claim 14, wherein the second control circuit comprises a second control register for receiving and storing the second address, the second read/write strobe signal and second data inputted from the second processor through the second bus, and for transmitting a second serial link request signal to the arbiter;
  a second shift register for receiving the second data stored at the second control register and for converting the second data into second serial data, and outputting the second serial data in response to a serial link grant signal applied from the arbiter.

18. The method of claim 14, wherein both of the first and second control circuits further output a serial clock signal of the same frequency for regulating the transmission of the serial data.

19. The method of claim 18, wherein:
  the first processor and the second processor operate mutually asynchronously from each other; or
  the operative frequency of the system clock of the first processor is not equal to the operative frequency of the system clock signal of the second processor.

* * * * *